(12) United States Patent
White et al.

(10) Patent No.: US 8,893,565 B2
(45) Date of Patent: Nov. 25, 2014

(54) APPARATUS FOR SENSING

(75) Inventors: Richard White, Huntingdon (GB); Jani Kivioja, Cambridge (GB)

(73) Assignee: Nokia Corporation, Espoo (FI)

( * ) Notice: Subject to any disclaimer, the term of this patent is extended or adjusted under 35 U.S.C. 154(b) by 194 days.

(21) Appl. No.: 13/548,702

(22) Filed: Jul. 13, 2012

(65) Prior Publication Data
US 2014/0013865 A1  Jan. 16, 2014

(51) Int. Cl.
*G01L 1/00* (2006.01)
(52) U.S. Cl.
USPC ........................................ 73/862.626; 73/862
(58) Field of Classification Search
USPC ................... 73/862.626, 862.541, 862.542
See application file for complete search history.

(56) References Cited

U.S. PATENT DOCUMENTS

| | | | |
|---|---|---|---|
| 8,319,748 B2 * | 11/2012 | Tseng et al. ................... 345/174 |
| 8,344,596 B2 * | 1/2013 | Nield et al. .................... 310/334 |
| 8,421,483 B2 * | 4/2013 | Klinghult et al. .............. 324/686 |
| 8,482,737 B2 * | 7/2013 | Wakai ............................ 356/454 |
| 8,542,203 B2 * | 9/2013 | Serban et al. .................. 345/173 |
| 2005/0229380 A1 | 10/2005 | Deconde et al. ................ 29/593 |
| 2006/0260417 A1 | 11/2006 | Son et al. .................. 73/862.046 |
| 2008/0048996 A1 | 2/2008 | Hu et al. ........................ 345/174 |
| 2008/0121045 A1 | 5/2008 | Cole et al. .................... 73/861.08 |
| 2010/0141605 A1 * | 6/2010 | Kang et al. .................... 345/174 |
| 2011/0018841 A1 | 1/2011 | Hristov .......................... 345/174 |
| 2011/0050619 A1 * | 3/2011 | Griffin .......................... 345/174 |
| 2011/0273396 A1 * | 11/2011 | Chung ........................... 345/174 |
| 2012/0038583 A1 | 2/2012 | Westhues et al. ............. 345/174 |
| 2012/0098789 A1 | 4/2012 | Ciesla et al. ................... 345/174 |
| 2012/0206401 A1 | 8/2012 | Lin et al. ....................... 345/174 |
| 2013/0009905 A1 | 1/2013 | Castillo et al. ................ 345/174 |

FOREIGN PATENT DOCUMENTS

| | | |
|---|---|---|
| CN | 102339166 A | 2/2012 |
| DE | 102006000637 A1 * | 7/2007 |
| EP | 1811364 A2 | 7/2007 |
| EP | 2026179 A1 | 2/2009 |
| KR | 20100065816 A | 6/2010 |

OTHER PUBLICATIONS http://electronicsbus.com/pressure-sensing-multi-touch-screen-trackpad-for-smartphone-tablet-pc-laptop/, "Pressure Sensing Multi-Touch Screen & Trackpad for Smartphones & Tablet PC/Laptops", (May 4, 2012), (5 pages).

JA Paradiso, et al, http://www.media.mit.edu/publications/bttj/Paper04Pages32-44.pdf, "Sensate Media-Multimodal Electronic Skins as Dense Sensor Networks", BT Technology Journal, vol. 22. No. 4, (Oct. 2004), (pages 32-44).

* cited by examiner

*Primary Examiner* — Lisa Caputo
*Assistant Examiner* — Jamel Williams
(74) *Attorney, Agent, or Firm* — Harrington & Smith (57) ABSTRACT

Embodiments of the disclosure relate to an apparatus including a first sensor arrangement configured in a first layer; a second sensor arrangement configured in a second layer; wherein the sensor arrangements are configured to vary an input signal in response to a sensed parameter; and the apparatus also including an input configured to receive an input signal and an output configured to provide an output signal that depends on each of the first and second sensor arrangements.

20 Claims, 8 Drawing Sheets

FIG. 11

APPARATUS FOR SENSING

TECHNOLOGICAL FIELD

Embodiments of the present disclosure relate to an apparatus for sensing. In particular, they relate to an apparatus for sensing which may sense a plurality of different parameters.

BACKGROUND

Sensors which enable user inputs and environmental parameters to be sensed are known. It may be useful to integrate such sensors into a single apparatus to enable a single apparatus to detect more than one different parameter or user input.

BRIEF SUMMARY

According to some, but not necessarily all, examplary embodiments of the disclosure there may be provided an apparatus comprising: a first sensor arrangement configured in a first layer; a second sensor arrangement configured in a second layer; wherein the sensor arrangements are configured to vary an input signal in response to a sensed parameter; and the apparatus also comprising an input configured to receive an input signal and an output configured to provide an output signal that depends on each of the first and second sensor arrangements.

In some embodiments the apparatus may comprise one or more further layers where a further sensor arrangement may be configured in each of the further layers. The output signal may depend on each of the first and second sensor arrangements and the further sensor arrangements.

In some embodiments the apparatus may comprise at least one non-sensing layer.

In some embodiments the apparatus may further comprise input circuitry configured to provide the input signal; and output circuitry configured to detect a first impedance value comprising at least a real component and configured to detect a second impedance value comprising at least an imaginary component, wherein the first component and the second component have a known phase off-set.

In some embodiments the input signal may comprise a time varying component.

In some embodiments the first impedance value may comprise only a real component and the second impedance value may comprise only an imaginary component, wherein the first component and the second component are in quadrature.

In some embodiments the apparatus may comprise first selection circuitry configure to selectively provide the input signal to the different selected sensor arrangements; second selection circuitry configured to selectively provide the input signal to a first portion of the selected sensor arrangement; and third selection circuitry configured to selectively receive the output signal from a second portion of the selected sensor arrangement, wherein the second portion overlaps the first portion of the first portion of the selected sensor arrangement. The second selection circuitry may be configured to sequence the first portion to which the input signal is provided through a series of different first portions of the selected sensor arrangement and the third selection circuitry may be configured to sequence the second portion from which the output signal is received through a series of different second portions of the selected sensor arrangement.

In some embodiments the first portions of the selected sensor arrangement may be parallel to a first direction and the second portions of the selected sensor arrangement may be parallel to a second direction, and wherein the first and second directions are orthogonal.

In some embodiments the apparatus may further comprise: circuitry configured to process output signals from different areas of the sensor arrangements; analysis circuitry configured to analyse the current capacitance and the current resistance for the different areas.

In some embodiments the second sensor arrangement may be formed on a substrate which forms the first sensor arrangement. The substrate may comprise a piezo-resistive substrate.

In some embodiments the substrate may be configured to be deformed in response to a force applied by the user of the apparatus.

According to some, but not necessarily all, examplary embodiments of the disclosure there may be provided a method of manufacturing an apparatus comprising: forming a first sensor arrangement configured in a first layer; forming a second sensor arrangement configured in a second layer; wherein the sensor arrangements are configured to vary an input signal in response to a sensed parameter; and providing an input configured to receive an input signal and providing an output configured to provide an output signal that depends on each of the first and second sensor arrangements.

In some embodiments the second sensor arrangement may be formed on a substrate which may form the first sensor arrangement.

In some embodiments the substrate may comprise a piezo-resistive substrate.

In some embodiments the substrate may be configured to be deformed in response to a force applied by the user of the apparatus.

In some embodiments the method may comprise forming one or more further layers where a sensor arrangement is formed in each of the further layers.

In some embodiments the output signal may depend on each of the first and second sensor arrangements and the further sensor arrangements.

In some embodiments the method may comprise forming at least one non-sensing layer.

According to some, but not necessarily all, examplary embodiments of the disclosure there may be provided an apparatus comprising: a piezo-resistive substrate configured to have a variable resistance that varies in response to a force applied to the apparatus; a sensor arrangement comprising at least one sensor mounted on the piezo-resistive substrate wherein the sensor is configured to vary an input signal in response to a sensed parameter; and an input configured to receive an input signal and an output configured to provide an output signal that depends upon the impedance of the piezo-resistive substrate and the parameter sensed by the at least one sensor of the sensor arrangement.

In some embodiments the sensor arrangement comprises at least one variable resistor where the variable resistor has a resistance that varies with a sensed parameter.

In some embodiments the sensor arrangement may comprise at least one capacitive sensor where the capacitive sensor has a capacitance that varies with a sensed parameter.

In some embodiments the piezo-resistive substrate may comprise a quantum tunnelling composite.

In some embodiments the piezo-resistive substrate and the sensor arrangement may be configured to provide a single output signal at the output that depends simultaneously upon both a impedance of the piezo-resistive substrate and a parameter sensed by the sensor arrangement.

In some embodiments the sensor arrangement may be applied to the piezo-resistive substrate using printing technology.

In some embodiments the apparatus may be configured to be deformed in response to a force applied by a user of the apparatus.

In some embodiments the sensor arrangement may comprise first sensors that vary with a first sensed parameter and second sensors that vary with a second sensed parameter.

In some embodiments the sensor arrangement may comprise sensors that vary with a plurality of parameters.

In some embodiments the sensed parameters may comprise at least one of applied stress, temperature, presence of a predetermined biological or chemical molecule, incident light, humidity, skin conductivity.

In some embodiments the apparatus may comprise a permeable layer overlaying the sensor arrangement.

In some embodiments the apparatus may comprise a conductive layer overlaying the sensor arrangement.

In some embodiments the apparatus may comprise a conductive layer provided underneath the piezo-resistive substrate.

According to some, but not necessarily all, examplary embodiments of the disclosure there may be provided a method of manufacturing an apparatus comprising: forming a piezo-resistive substrate configured to have a variable resistance that varies in response to a force applied to the apparatus; mounting a sensor arrangement comprising at least one sensor on the substrate wherein the sensor is configured to vary an input signal in response to a sensed parameter; and providing an input configured to receive an input signal and providing an output configured to provide an output signal that depends upon the impedance of the piezo-resistive substrate and the parameter sensed by the at least one sensor of the sensor arrangement.

In some embodiments the method may comprise forming a permeable layer overlaying the sensor arrangement.

In some embodiments the method may comprise forming a conductive layer overlaying the sensor arrangement.

In some embodiments the method may comprise forming a conductive layer provided underneath the piezo-resistive substrate.

The apparatus may be for sensing.

BRIEF DESCRIPTION

For a better understanding of various examples of embodiments of the present disclosure reference will now be made by way of example only to the accompanying drawings in which.

DETAILED DESCRIPTION

The Figures illustrate an apparatus 10 comprising: a piezo-resistive substrate 31 configured to have a variable resistance that varies in response to a force applied to the apparatus 10; a sensor arrangement 12 comprising at least one sensor mounted on the piezo-resistive substrate 31 wherein the sensor is configured to vary an input signal 11 in response to a sensed parameter; and an input configured to receive an input signal 11 comprising a time varying component and an output configured to provide an output signal 13 that depends upon the resistance of the piezo-resistive substrate 31 and the parameter sensed by the at least one sensor of the sensor arrangement 12.

The Figures also illustrate an apparatus 10 comprising: a first sensor arrangement 12A configured in a first layer 71A; a second sensor arrangement 12B configured in a second layer 71B; a third sensor arrangement 12C configured in a third layer 71C; wherein the sensor arrangements 12 are configured to vary an input signal in response to a sensed parameter; and the apparatus 10 also comprising an input configured to receive an input signal comprising a time varying component and an output configured to provide an output signal that depends on each of the first, second and third sensor arrangements.

Figure 1:
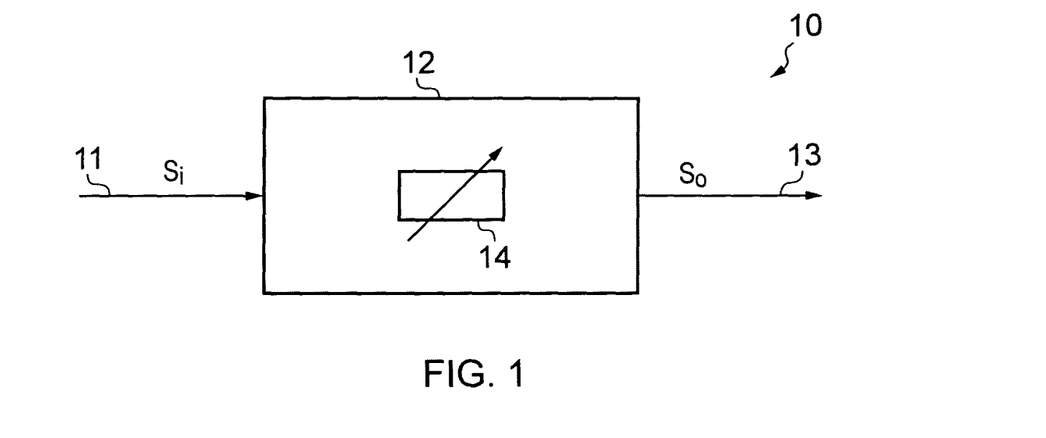
FIG. 1 illustrates an example of an apparatus.

FIG. 1 schematically illustrates an example of an apparatus 10. The apparatus 10 may comprise: a sensor arrangement 12 for sensing a parameter and at least one variable impedance 14 integrated within the sensor arrangement 12.

In some embodiments the variable impedance 14 may comprise a piezo-resistive substrate 31 which may be configured to have a variable resistance which varies in response to a force applied to the apparatus 10. The force may be applied to the apparatus 10 by a user of the apparatus 10. This may enable the piezo-resistive substrate 31 to be used to determine forcefulness of a user touch or other type of interaction on the sensor arrangement 12. This may also enable the piezo-resistive substrate 31 to be used determine whether, how and to what degree an apparatus 10 comprising the sensor arrangement 12 is deformed.

The deformation of the apparatus 10 may comprises a change in size and/or shape of the apparatus 10. The change in size and/or shape may be caused by a user twisting and/or bending and/or applying a shear force to the apparatus 10. The extent of distortion facilitated by the apparatus 10 depends upon implementation. In some embodiments the apparatus 10 may be configured to be resiliently contorted. Resilient contortion implies that the body stays in its contorted state while held in that state and returns to its equilibrium shape when released.

In some embodiments the sensor arrangement 12 may comprise at least one variable resistor sensor where the resistor has a resistance that varies with a sensed parameter. The sensor arrangement 12 may comprise at least one variable resistance sensor which may have a variable resistance that varies with, for example, stress, presence of a specific chemical or biochemical molecule, incident light, humidity or any other suitable parameter. In some example embodiments a variable resistance sensor may be mounted on the piezo-resistive substrate 31.

In some embodiments the sensor arrangement 12 may comprise at least one capacitive sensor where the capacitive sensor has a capacitance that varies with a sensed parameter. The sensor arrangement 12 may comprise at least one capacitive sensor which may have a capacitance that varies with, for example, strain, presence of a specific chemical or biochemical molecule, incident light, humidity or any other suitable parameter. The capacitive sensor may be mounted on the piezo-resistive substrate 31.

In some embodiments the sensor arrangement 12 may comprise a both variable resistive sensors and capacitive sensors.

The integration of one or more different sensors within the apparatus 10 may enable the apparatus 10 to be used to sense a plurality of different parameters. For example if the apparatus 10 comprises a piezo-resistive substrate 31 then this may be used to sense a force applied to the apparatus 10. For example, the piezo-resistive substrate 31 may detect that a user is touching the apparatus 10 or is applying force which bends or contorts or otherwise deforms the apparatus 10. The sensor arrangement 12 may be used to sense environment parameters. Capacitive and resistive sensors may be used to detect different environment parameters. In some embodiments the environment parameters may comprise parameters relating to the physiological properties of the user.

The apparatus 10 illustrated in FIG. 1 comprises an input configured to receive an input signal 11. The input signal 11 may comprise a time varying component.

The apparatus 10 also comprises an output configured to provide an output signal 13. The output signal 13 may depend simultaneously upon the resistance of the variable impedance 14 and the parameters sensed by sensor arrangement 12. In embodiments where the apparatus 10 comprises a piezo-resistive substrate 31 the output signal 13 may depend on both the resistance of the piezo-resistive substrate 31 and a parameter sensed by the sensor arrangement 12.

Figure 2:
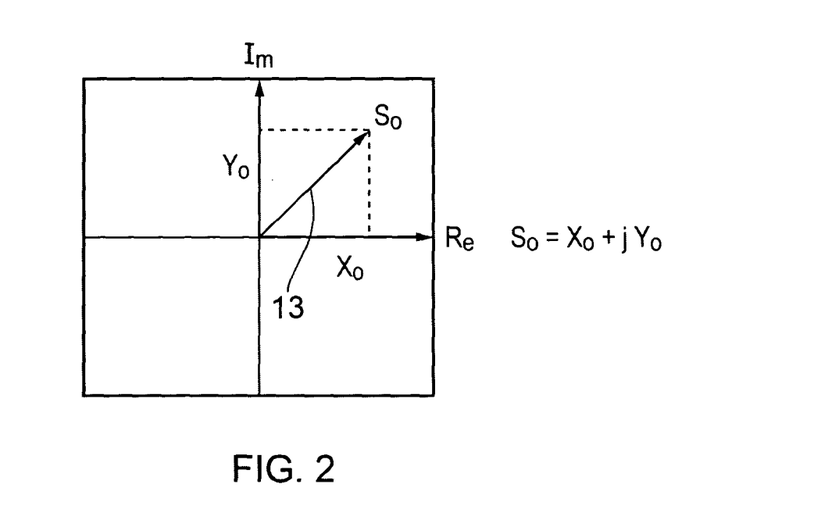
FIG. 2 illustrates an example of an output signal.

FIG. 2 is an Argand diagram illustrating an example of an output signal 13 that depends upon both the parameter sensed by the sensor arrangement 12 and the resistance of the piezo-resistive substrate 31.

The output signal 13 has a real component $X_o$ and an imaginary component $Y_o$. The imaginary component has a phase difference over the real component of $\pi/2$ radians that is they are orthogonal (in quadrature).

It is therefore possible to process the output signal 13 to determine the real component $X_o$ and an imaginary component $Y_o$. It is also possible to analyse the real component $X_o$ and an imaginary component $Y_o$ to detect changes in the parameter sensed by the sensor arrangement 12 and/or the resistance of the piezo-resistive substrate 31. This provides useful information which may be used to differentiate bending, twisting and stretching of the apparatus including inputs such as touch, hover, pressure.

FIGS. 3A to 3D illustrate an apparatus 10 according to an example embodiment. In this example embodiment the apparatus 10 comprises a piezo-resistive substrate 31 and a sensor arrangement 12 mounted on the piezo-resistive substrate 31.

Figure 3A:
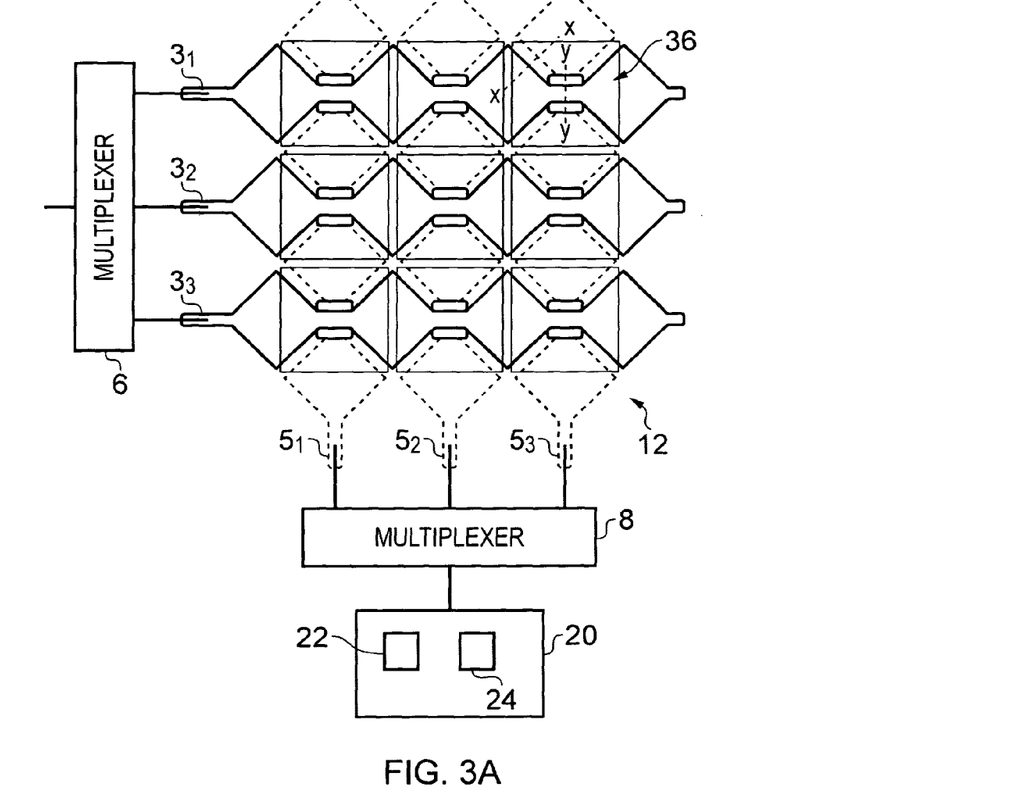
FIGS. 3A to 3D illustrate another example of an apparatus.
Figure 3B:
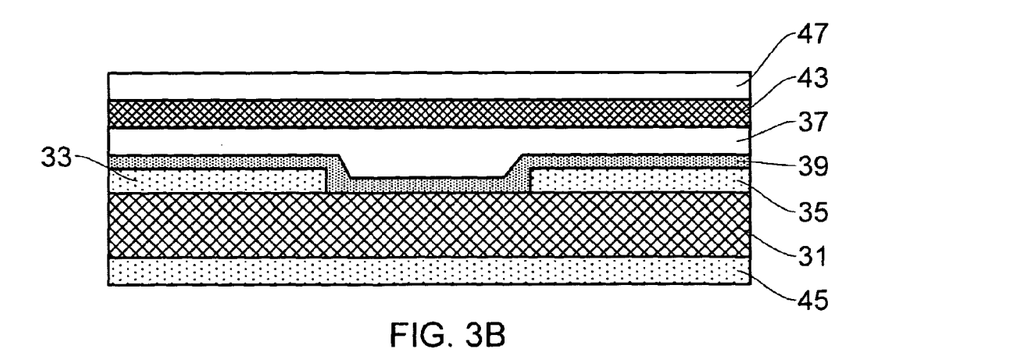
Figure 3C:
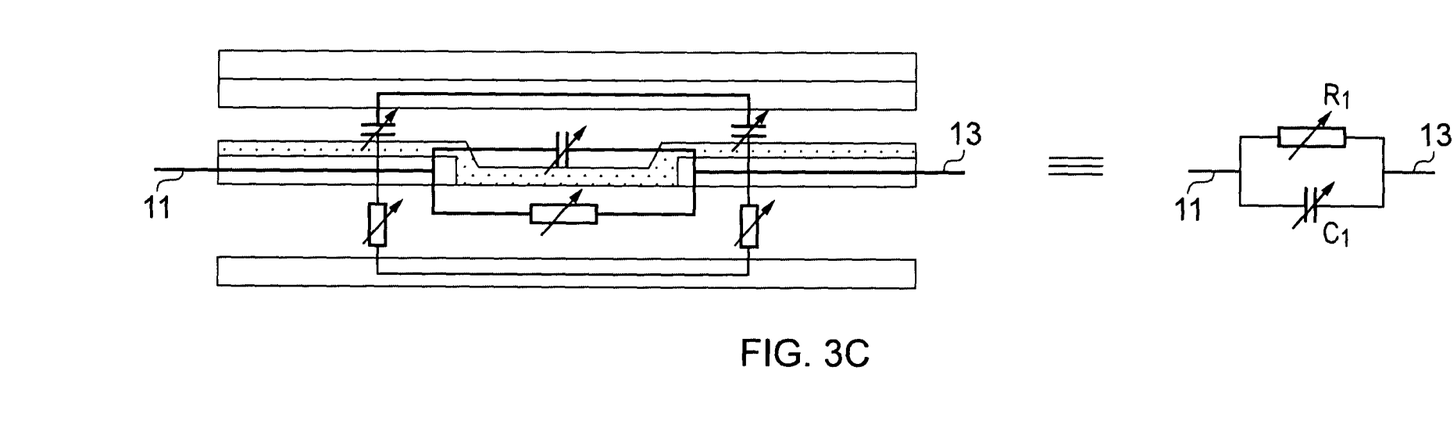
Figure 3D:
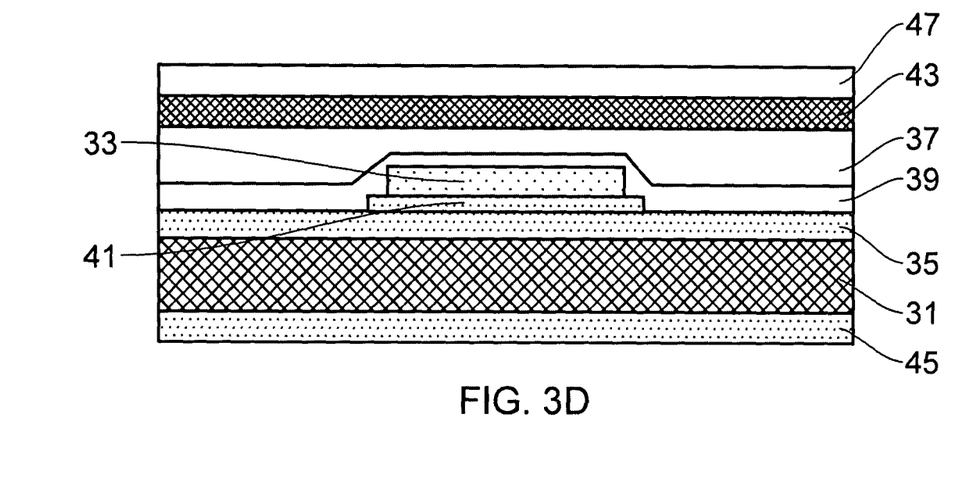

FIG. 3A schematically illustrates an example of a sensor arrangement 12. FIG. 3B illustrates a cross section though the line X-X. FIG. 3C illustrates a circuit of each of the portion of the sensor arrangement 12 illustrated in FIG. 3B. FIG. 3D illustrates a cross section through the line Y-Y.

As illustrated in FIGS. 3B and 3D the apparatus 10 comprises a piezo-resistive substrate 31. The piezo-resistive substrate 31 may comprise any material which may be sensitive to a force applied to the apparatus 10. The force applied to the apparatus 10 may change the resistance of the piezo-resistive substrate 31. The piezo-resistive substrate 31 may be configured to be sensitive to a force applied by a user pressing or compressing the apparatus 10. The piezo-resistive substrate 31 may be configured to be sensitive to other mechanical deformations such as twisting bending or stretching.

The piezo-resistive substrate 31 may comprise any suitable material. For example, the piezo-resistive substrate 31 may comprise force sensitive rubber or any other suitable conductive composites. In some embodiments the piezo-resistive substrate 31 may comprise a composite of filler particles within an insulating matrix. The filler particles may comprise conducting particles and/or semi-conducting particles and/or non-conducting particles. In such embodiments the electrical conduction may be based on percolation theory so that as the piezo-resistive substrate 31 is stressed the filler particles may come into contact and one or more conduction paths may be formed in the piezo-resistive substrate 31.

In some examples the piezo-resistive substrate 31 may comprise a quantum tunneling composite. In such embodiments the electrical conduction is based on electron tunnelling. The piezo-resistive substrate 31 may have a resistivity which may be dependent on temperature. This may enable the apparatus 10 to be used to detect temperature or changes in temperature.

The sensor arrangement 12 illustrated in FIG. 3A may be configured to enable the spatial distribution of strain within the piezo-resistive substrate 31 to be measured.

The apparatus 10 also comprises a plurality of drive electrodes 33 and a plurality of sense electrodes 35. The drive and sense electrodes 33, 35 may be mounted on the piezo-resistive substrate 31. In some embodiments one or both of the drive and sense electrodes 33, 35 may be mounted directly onto the piezo-resistive substrate 31 so that the electrode 33, 35 contacts the piezo-resistive substrate 31. In some embodiments there may be one or more layers between the piezo-resistive substrate 31 and the electrodes 33, 35. The one or more layers may act to insulate the electrodes 33, 35 from the piezo-resistive substrate 31.

In some embodiments the resistance of the piezo-resistive substrate 31 may be transduced capacitively. In such embodiments if an insulating layer is provided between the electrodes 33, 35 and the piezo-resistive substrate 31 then the real resistance will remain open-circuit when a stress is applied to the apparatus 10. However the capacitance will change as the piezo-resistive substrate 31 becomes conductive. For example, when the apparatus 10 is in an un-stressed state then the insulating layer then the capacitance of the insulating layer may be $C_1$ and the capacitance of the piezo-resistive substrate 31 may be $C_2$. The two layers are effectively capacitors in series and so have a total capacitance of C where $1/C=1/C_1+1/C_2$. When a stress is applied to the apparatus 10 this increases the conductivity of the piezo-resistive substrate 31 and the value of $C_2$ becomes negligible and the total capacitance of the system becomes $C=C_1$.

The drive and sense electrodes 33, 35 may be configured to conduct the input and output signals respectively. The drive and sense electrodes may comprise any suitable conductive material such as silver nanowires, carbon nanotubes, graphene, indium tin oxide (ITO), gold, silver, copper, platinum or any other suitable material.

The apparatus 10 also may comprise a layer of environment sensitive material 37. The environment sensitive material 37 may be provided overlaying the electrodes 33, 35.

The environment sensitive material 37 may comprise any material which may be configured to be sensitive to environmental parameters such as temperature, light, humidity, biological or chemical molecules or any other suitable parameters. In some embodiments the environment sensitive material may also be configured to be sensitive to environmental parameters which may include parameters relating to the user of the apparatus 10. For example, the environmental parameters may include parameters relating to the physiological properties of the user such as the conductivity of the user's skin, the temperature of the user's skin, the humidity of the user's skin or any other property such as the pH of the skin or sweat.

The environment sensitive material 37 may have a capacitive or resistive transduction mechanism. If the environment sensitive material 37 has a capacitive transduction mechanism then the environmental parameter may change the permittivity of the material. Similarly if the environment sensitive material 37 has a resistive transduction mechanism then the environmental parameter may change the resistivity of the material. In some embodiments of the disclosure different types of environment sensitive material 37 may be provided at different points of the sensor arrangement 12.

In embodiments where an environment sensitive material 37 which has a capacitive transduction mechanism is provided the environment sensitive material 37 may comprise any suitable material such as polysiloxane and methacrylic polymers, polyimide, poly(vinyl pyrrolidone), poly (vinyl alcohol), ceramic materials or any other suitable material.

In the illustrated example of FIG. 3B an impermeable layer 39 is provided between the environment sensitive layer 37 and the electrodes 33, 35. The impermeable layer may be configured to protect the electrodes 33, 35 from environmental parameters which may pass through any permeable layers. In the portion of the apparatus 10 illustrated in FIG. 3B the impermeable layer 39 is also provided between the drive electrode 33 and the sense electrode 35. The impermeable layer may comprise, for example, glass, parylene, PTFE, PET or any other suitable material.

In some embodiments an environment sensitive material 37 which has a resistive transduction mechanism is provided. In such embodiments the electrodes 33, 35 may be isolated from the piezo-resistive substrate 31. The environment sensitive material may be conductive, semi-conductive or a dielectric depending upon the configuration of the electrodes 33, 35. Different transductions methods may be used for different stimuli which are to be detected.

In this portion of the apparatus 10 the environment sensitive layer 37 is provided overlaying the two electrodes 33, 35. The environment sensitive material 37 may comprise any suitable material such as polyaniline, poly (p-phenylene vinylene), polypyrrole or other conductive polymer or a conducive or semi-conductive inorganic material or any other suitable material.

In the portion of the apparatus 10 illustrated in FIGS. 3B and 3D an impermeable layer 39 is provided between the environment sensitive layer 37 and the electrodes 33, 35. The impermeable layer 39 may be configured to protect the electrodes 33, 35 from environmental parameters which may pass through any permeable layers. In the portion of the apparatus illustrated in FIG. 3D the impermeable layer 39 is not provided between the drive electrode 33 and the sense electrode 35. This may enable a direct electrical connection between the electrodes 33, 35. The impermeable layer 39 may comprise, for example, glass, parylene, PTFE, PET, PEN, acrylic resin or any other suitable material.

In the portion of the apparatus illustrated in FIG. 3D a dielectric spacer 41 may be provided between the drive electrode 33 and the sense electrode 35. The dielectric spacer 41 may comprise any suitable material such as parylene, silicon dioxide, aluminium oxide, insulating polymers or any other suitable material. In some embodiments the material used for the dielectric spacer 41 may also be used for sensing. The material used for the dielectric spacer 41 may be used for sensing in resistive and/or capacitive sensing modes.

In the portion of the apparatus illustrated in FIG. 3D the conductivity of the environment sensing layer 39 may be greater than the conductivity of the piezo-resistive substrate 31 but less than the conductivity of the electrodes 33, 35.

In both the portions of the apparatus 10 illustrated in FIGS. 3B and 3D the apparatus 10 comprises a top conductive layer 43 and lower conductive layer 45. The top conductive layer 43 may be provided overlaying the environment sensing layer 37. The top conductive layer 43 may be permeable. The top conductive layer 43 may be provided to provide electrical shielding from the environment to the electrodes 33, 35 and piezo-resistive substrate 31. The top conductive layer 43 may also be configured to increase the capacitance between the drive and sense electrodes 33, 35.

The lower conductive layer 45 may comprise any suitable electrically conductive material. For example, the lower conductive layer 45 may comprise silver nanowires, carbon nanotubes, graphene, ITO, gold, silver, copper, platinum or any other suitable material. The lower conductive layer 45 may be provided in embodiments where the piezo-resistive substrate 31 comprises a quantum tunnelling composite as this may enable electrons to tunnel though the piezo-resistive substrate 31.

In both the examples of FIGS. 3B and 3D the apparatus 10 also comprises permeable coating 47. The permeable coating 47 may overlay all the other layers of the apparatus 10. The permeable coating 47 may form an outer surface of the apparatus 10 which may be touched or actuated by the user of the apparatus 10. The permeable coating 47 may form an outer surface of the apparatus 10 which may come into direct contact with environment or environmental parameters.

The permeable coating 47 may comprise any material which may be configured to enable the environmental parameters to be passed through and detected by the environment sensing layer 37. The permeable coating 47 may comprise a permeable polymer or silicone or any other suitable material.

In some embodiments the permeable layers 47, 43 may be selectively permeable. For example, they may allow some environmental parameters to permeate through to the environment sensing layer 39 while other parameters may be prevented from passing through. Different permeable layers 47, 43 may be permeable to different parameters and different environment sensing layers 39 may be configured to sense different environmental parameters.

The respective layers illustrated in FIGS. 3B and 3D may be mounted on an underlying surface. The underlying surface may be a portable electronic device. The portable electronic device may comprise the necessary electronics and processing circuitry for operation of the sensor arrangement 12.

FIG. 3C illustrates a circuit of the portion of the apparatus 10 illustrated in FIG. 3B. In this portion of the apparatus 10 the drive and sense electrodes 33, 35 form a capacitance sensor which may be configured to detect environmental parameters. The piezo-resistive substrate 31 may be configured to detect a force applied to the apparatus 10.

In this example, the resistance $R_1$ of the piezo-resistive substrate 31 is connected in electrical parallel to the variable capacitance $C_1$ of the capacitance sensor arrangement. The total impedance of this portion of the apparatus 10 is $Z(R_1)//Z(C_1)$. This may be expressed as $X_o(w, C_1, R_1) + j Y_o(w, C_1, R_1)$ where w is frequency.

It is therefore possible in this example and other examples to match a change in the measured value of $X_o$ and $Y_o$ with a change in $C_1$ and/or $R_1$ either algebraically or using pre-stored calibration data. It may, in some circumstances, be necessary to measure $X_o$ and $Y_o$ at different values of w.

In the portion of the apparatus 10 illustrated in FIG. 3D the drive and sense electrodes 33, 35 form a variable resistance sensor which may be configured to detect environmental parameters and/or a force applied to the apparatus 10.

In this example the piezo-resistive substrate 31 may have a lower conductivity than the variable resistance sensor. In such examples the variable resistance sensor effectively short circuits the piezo-resistive substrate 31 and the piezo-resistive substrate 31 is not active for sensing in this portion of the apparatus 10.

FIG. 3A schematically illustrates an examplary sensor arrangement 12. The sensor arrangement 12 comprises a plurality of sensor cells 26. The sensor cells 36 are arranged as an array (grid). The sensor arrangement 12 comprises a distributed network of cells 36 arranged as an array. In the illustrated example of FIG. 3A, the array is regular comprising regularly spaced parallel rows and regularly spaced parallel columns. In the illustrated example, the array is also orthogonal in that the rows are orthogonal to the columns. However, for some applications the array may not be regular and/or may not be orthogonal.

The apparatus 10 comprises first selection circuitry 6 and second selection circuitry 8. The selection circuitry 6, 8 may comprise a multiplexer.

The apparatus 10 also comprises an output configured to provide an output signal 13 that depends simultaneously upon both the parameters sensed by the sensor arrangement 12 and the resistivity of the piezo-resistive substrate 31.

The apparatus 10 may be configured so that each of the cells 36 in the sensor arrangement 12 may be separately tested. The first selection circuitry 6 may be configured to direct the input signal 11 to a particular cell 36. The second selection circuitry 8 may be configured to direct the output signal 13 from a particular cell 36. The first selection circuitry 6 and the second selection circuitry 8 may be synchronised so that they simultaneously direct the input signal 11 to and direct the output signal 13 from, the same 'active' cell 36.

For example, the first selection circuitry 6 may comprise a multiplexer that switches to direct the input signal 11 to a row of capacitor cells 36. The second selection circuitry 8 may comprise a multiplexer that switches to direct the output signal 13 from a column of capacitor cells 36. Each row therefore shares a common input 3 through the first multiplexer 6 and each column shares a common output 5 through the second multiplexer 8. The multiplexer 6 may be configured to direct the input signal 11 to a particular 'active' row of cells 36. The multiplexer 8 may be configured to direct the output signal 13 from a particular 'active' row of cells. The first selection circuitry 6 and the second selection circuitry 8 may be synchronised so that they simultaneously direct the input signal 11 to and direct the output signal 13 from, the same 'active' cell 36 that is in both the active row and the active column.

The first selection circuitry 6 may be configured to sequence the row to which the input signal 11 is provided through a series of different rows. Each row may be made active once in a period T1 for a time T2. The second selection circuitry 8 may be configured to sequence the column from which the output signal 13 is received through a series of different columns. Each column may be made active once in the time period T2.

In some embodiments the signals may have a regular time sequence, as described above, where each cell is addressed for as frequently and for the same amount of time as all the other cells. In other embodiments the signals may have an irregular time sequence so that some cells are addressed more frequently than others and/or for a longer period of time.

In some embodiments all of the cells may be active all of the time. in other embodiments some of the cells may only be active and addressed by an input signal for a portion of the time. For example, some cells may only be made active and addressed by an input signal in response to a detected parameter.

It should be appreciated that although it is described that input is provided to rows and output taken from columns, this may be reversed, so that input is provided to columns and output taken from rows. Depending upon context, the terms 'row' and 'column' may therefore be interchanged.

The apparatus 10 also comprises processing circuitry 22 configured to process output signals 13 from different areas (cells) of the sensor arrangement 12. The processing circuitry may be configured to determine the current capacitance for the different areas and/or the current resistance for the different areas. The apparatus 10 may also comprises analysis circuitry 24 configured to analyse the current capacitance and/or the current resistance for the different areas (cells).

The processing circuitry 22 and the analysis circuitry may be integrated in a module 20 or they may be provided separately.

In some embodiments a differential sensing analysis may be used. In such embodiments two or more adjacent cells 36 in the array may be used in combination. The first cell may be used as a reference cell. The reference cell may be configured to be insensitive to the environment. To make the reference node insensitive to the environment an additional impermeable layer 39 may be provided. The additional impermeable layer 39 may be positioned between the top conductive layer 43 and the environment. In some embodiments the additional impermeable layer 39 may be positioned between the permeable coating 47 and the environment. In some embodiments the additional impermeable layer 39 may be provided by forming an impermeable coating on the surface of the apparatus and then selectively removing portions of the coating to make to portions permeable. The reference cell and the active cell may be used to reject common-mode signals associated with the deformation of the environment sensing layer 37.

Figure 4:
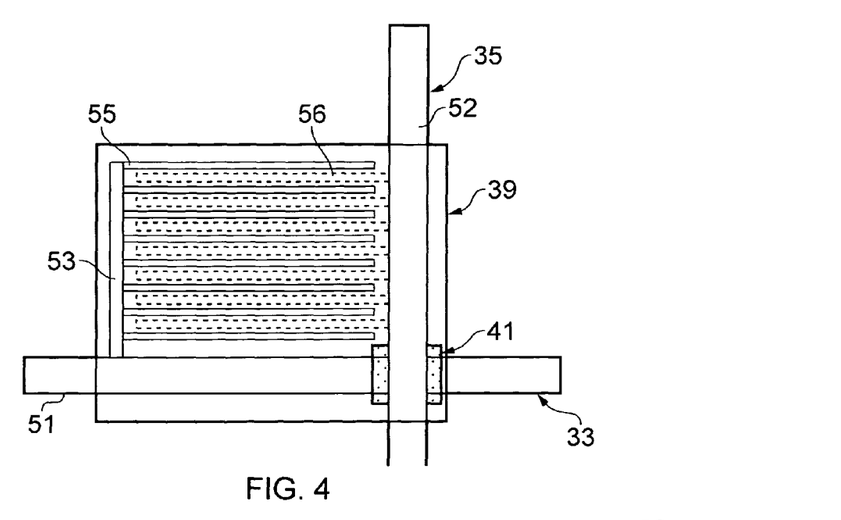
FIG. 4 illustrates a further example of an apparatus.

It is to be appreciated that the embodiments of the disclosure are limited to the arrangements and configurations illustrated in FIG. 3A. FIG. 4 schematically illustrates an apparatus 10 according to another embodiment of the disclosure. In this embodiment the electrodes 33, 35 may have an interdigitated structure. It is to be appreciated that the example illustrated in FIG. 4 is one of many possible arrangements. Other arrangements may include, for example, a parallel plate arrangement or interpenetrating coil arrangement for the electrodes 33, 35.

The drive electrode 33 and the sense electrode 35 may be provided on a piezo-resistive substrate. An environment sensing layer 39 may be provided between the electrodes 33, 35 and the environment. The environment sensing layer 39 may comprise any suitable material as described above.

The electrode arrangement illustrated in FIG. 4 comprises a drive electrode 33 and a sense electrode 35. The portion of the drive electrode 33 illustrated in FIG. 4 comprises a first elongate portion 51, a second elongate portion 53 and a plurality of third elongate portions 55. The second elongate portion 53 extends from the first elongate portion 51 in a direction orthogonal to the first elongate portion 51. The plurality of third elongate portions 55 extend from the second elongate portion 53 in a direction orthogonal to the second elongate portion 53 and parallel to the first elongate portion 51.

The portion of the sense electrode 33 illustrated in FIG. 4 also comprises a first elongate portion 52. The first elongate portion 51 of the drive electrode 33 and the first elongate portion 52 extend in orthogonal directions.

The first elongate portion 51 of the drive electrode 33 and the first elongate portion 52 of the sense electrode 35 are configured to cross over each other. A dielectric spacer 41 may be provided between the two electrodes 33, 35 at the point where they cross over to avoid a short circuit. A conductive spacer 41 may be provided to form a variable resistive sensor.

The sense electrode 35 also comprises a plurality of second elongate portions 56. The second elongate portions 56 extend from the first elongate portion 52 in a direction orthogonal to the first elongate portion 52. The plurality of second portions 56 of the sense electrode 35 may be positioned so that they are located between the plurality of third portions 55 of the drive electrode 33. This may form an interdigitated structure where the layout of the electrodes 33, 35 resembles interlocking fingers. This may enable a capacitive sensor to be formed by the electrodes 33, 35.

Figure 5A:
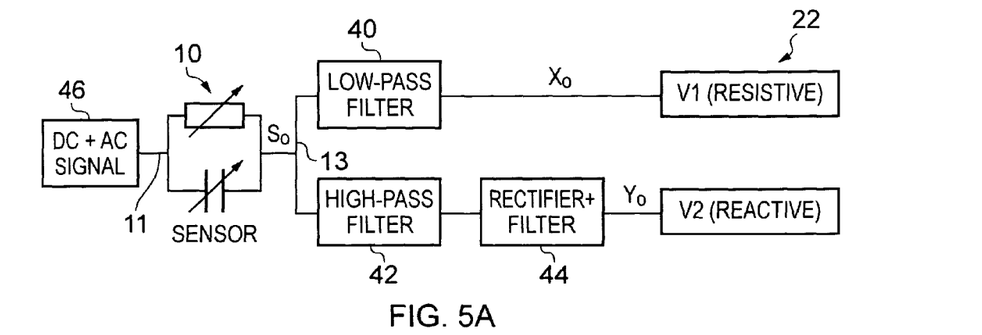
FIGS. 5A and 5B illustrate a system comprising a signal generator for providing the input signal to the apparatus.
Figure 5B:
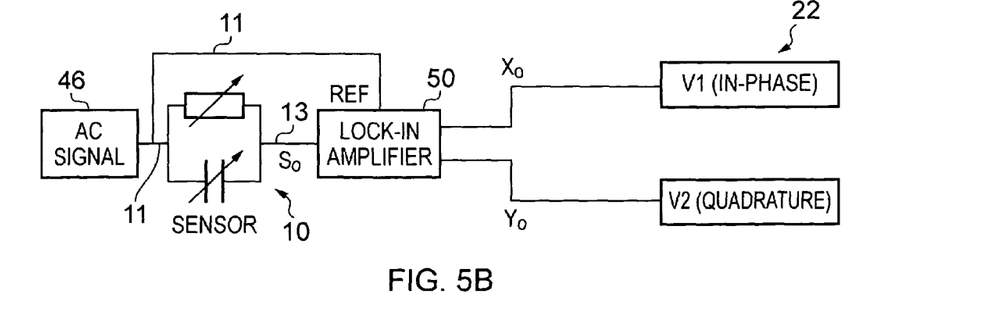

FIGS. 5A and 5B illustrate a system comprising a signal generator 46 for providing the input signal 11 to the apparatus 10 and processing circuitry 22 configured to detect a first signal value comprising at least a real component and configured to detect a second signal value comprising at least an imaginary component, wherein the first component and the second component have a known phase off-set. The first signal value is typically the real component $X_o$ of the output signal 13 and the second value is typically the imaginary component $Y_o$ of the output signal 13.

In FIG. 5A, the signal generator 26 simultaneously provides an input signal 11 that comprise an alternating component and a static component. The alternating component may be at a single frequency or a mixture of frequencies.

The processing circuitry 22 comprises a low-pass filter 40 that filters the output signal 13 blocking the alternating component but allowing the static (dc) component Xo to pass.

The processing circuitry 22 comprises in parallel to the low-pass filter 40 a high pass filter 42 that filters the output signal 13 blocking the static (dc) component but allowing the alternating (ac) component $Y_o$ to pass. A rectifier and filter 44 may be used further process the filtered signal.

In FIG. 5B, the signal generator 26 simultaneously provides an input signal 11 that comprises an alternating component only. The alternating component may be at a single frequency.

The processing circuitry 22 comprises a lock-in amplifier 50 that receives the output signal 13 as an input and the input signal 11 as a reference. It produces as a first output, $X_o$, the in-phase component and as a second output, $Y_o$, the quadrature-phase component.

After a signal $X_o$ dependent upon the current resistance and a signal $Y_o$ dependent upon the current capacitance have been isolated by the processing circuitry 22 they may be analysed.

Analysis circuitry 24 may be configured to analyse the current capacitance and the current resistance for the different cells 36 (located at different areas) to:
a) detect a location of user touch input
b) estimate a magnitude of pressure applied by a user touch input
c) estimate a deformation of the apparatus 10 by the user
d) determine a sensed environmental parameter As mentioned above the environmental parameter may include physiological parameters such as the conductivity of the user's skin, the temperature of the user's skin, the humidity of the user's skin or any other property such as the pH of the skin or sweat.

The analysis may use stored calibration data.

Figure 6:
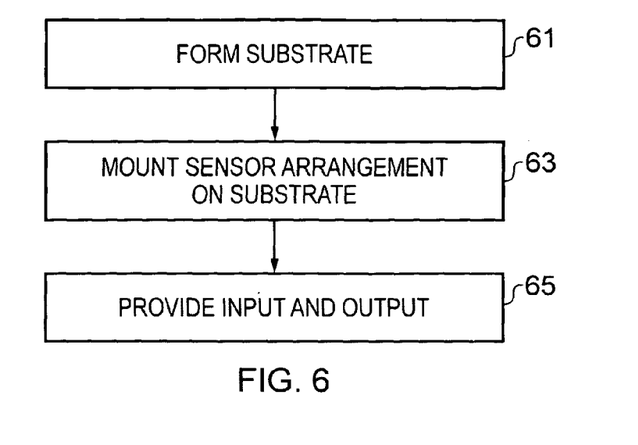
FIG. 6 illustrates a method.

FIG. 6 illustrates a method of manufacturing an apparatus 10 according to an embodiment. The method comprises, at block 61, forming a piezo-resistive substrate 31 configured to have a variable resistance that varies in response to a force applied to the apparatus 10.

The method also comprises, at block 63, mounting a sensor arrangement 12 comprising at least one sensor on the piezo-resistive substrate 31 wherein the sensor is configured to vary an input signal in response to a sensed parameter.

The sensor arrangement 12 may comprise a plurality of electrodes 33, 35. The electrodes 33, 35 may be formed on the piezo-resistive substrate 31 using any suitable technique.

The method also comprises, at block 65, providing an input configured to receive an input signal 11 comprising a time varying component and providing an output configured to provide an output signal 13 that depends upon the resistance of the piezo-resistive substrate 31 and the parameter sensed by the at least one sensor of the sensor arrangement 12.

In some embodiments the method may comprise further blocks such as forming a protective layer over the sensor arrangement 12.

Figure 7:
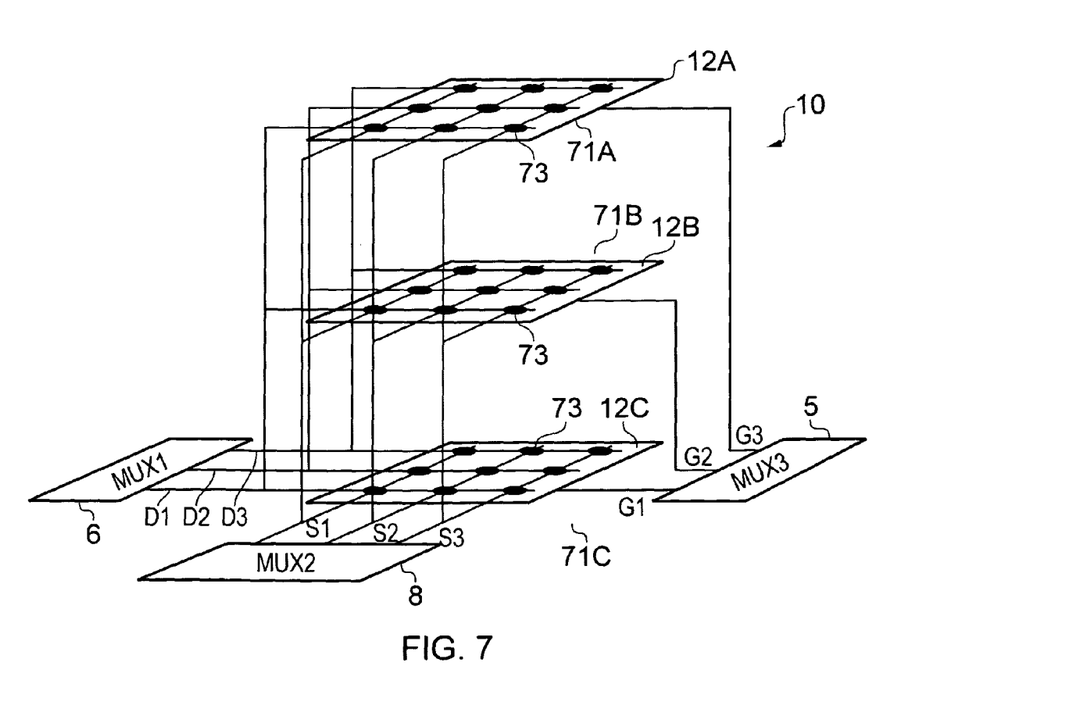
FIG. 7 schematically illustrates an example embodiment which may be used to integrate further sensors into an apparatus.

FIG. 7 schematically illustrates an example embodiment which may be used to integrate further sensors into an apparatus 10. In the example of FIG. 7 the apparatus 10 may comprise a plurality of sensor arrangement 12 where each of the sensor arrangements 12 may be may be provided in a different layer.

The sensor arrangements 12 may comprise capacitive and/or variable resistance sensors as described above. In some embodiments one or more of the sensor arrangements 12 may comprise a piezo-resistive substrate 31 as described above. However it is to be appreciated that embodiments of the disclosure could be implemented using just capacitive and/or resistive sensors.

A variable resistance sensor may have a variable resistance that varies with, for example, strain, presence of a specific chemical or biochemical molecule, light, temperature or any other suitable parameter. A capacitive sensor may have a capacitance that varies with, for example strain, presence of a specific chemical or biochemical molecule, light, temperature or any other suitable parameter. The capacitive sensors may also be configured to detect a user touching or otherwise actuating a surface of the apparatus 10.

In the apparatus 10 schematically illustrated in FIG. 7 three sensor arrangements 12 are provided. Each of the sensor arrangements 12 are provided in a different layer 71. In some embodiments the layers 71 may be physically separate or distinct layers.

Each of the sensor arrangements 12 comprises a plurality of sensors. In the example of FIG. 7 the plurality of sensors 73 are arranged in a grid. Each grid comprises a plurality of rows of sensors and a plurality of columns of sensors. The rows and columns may be arranged to be orthogonal or substantially orthogonal to each other. The layers 71 may be arranged to extend orthogonal to or substantially orthogonal to the rows and columns. In other embodiments other arrangements may be used.

The apparatus illustrated in FIG. 7 also comprises first selection circuitry 6 and second selection circuitry 8. The selection circuitry may comprise a multiplexer. As described above the first selection circuitry 6 may be configured to sequence the row to which the input signal 11 is provided through a series of different rows. Each row may be made active once in a period T1 for a time T2. The second selection circuitry 8 may be configured to sequence the column from which the output signal 13 is received through a series of different columns. Each column may be made active once in the time period T2.

In some embodiments the signals may have a regular time sequence, as described above, where each cell is addressed for as frequently and for the same amount of time as all the other cells. In other embodiments the signals may have an irregular time sequence so that some cells are addressed more frequently than others and/or for a longer period of time.

In some embodiments all of the cells may be active all of the time. in other embodiments some of the cells may only be active and addressed by an input signal for a portion of the time. For example, some cells may only be made active and addressed by an input signal in response to a detected parameter.

The apparatus 1 may be configured so that the same first selection circuitry 6 and second selection circuitry 8 may be used for each of the different layers 71. The apparatus 10 may comprises third selection circuitry 5 which may be configured to switch the first and second selecting circuitry 6, 8 between the respective layers 71. In the example apparatus 10 of FIG. 7 this may be achieved by only activating drive and sense electrodes in a given layer 71 when the gate electrode for that layer 71 is set to be non-zero by the third selection circuitry 5.

Figure 8:
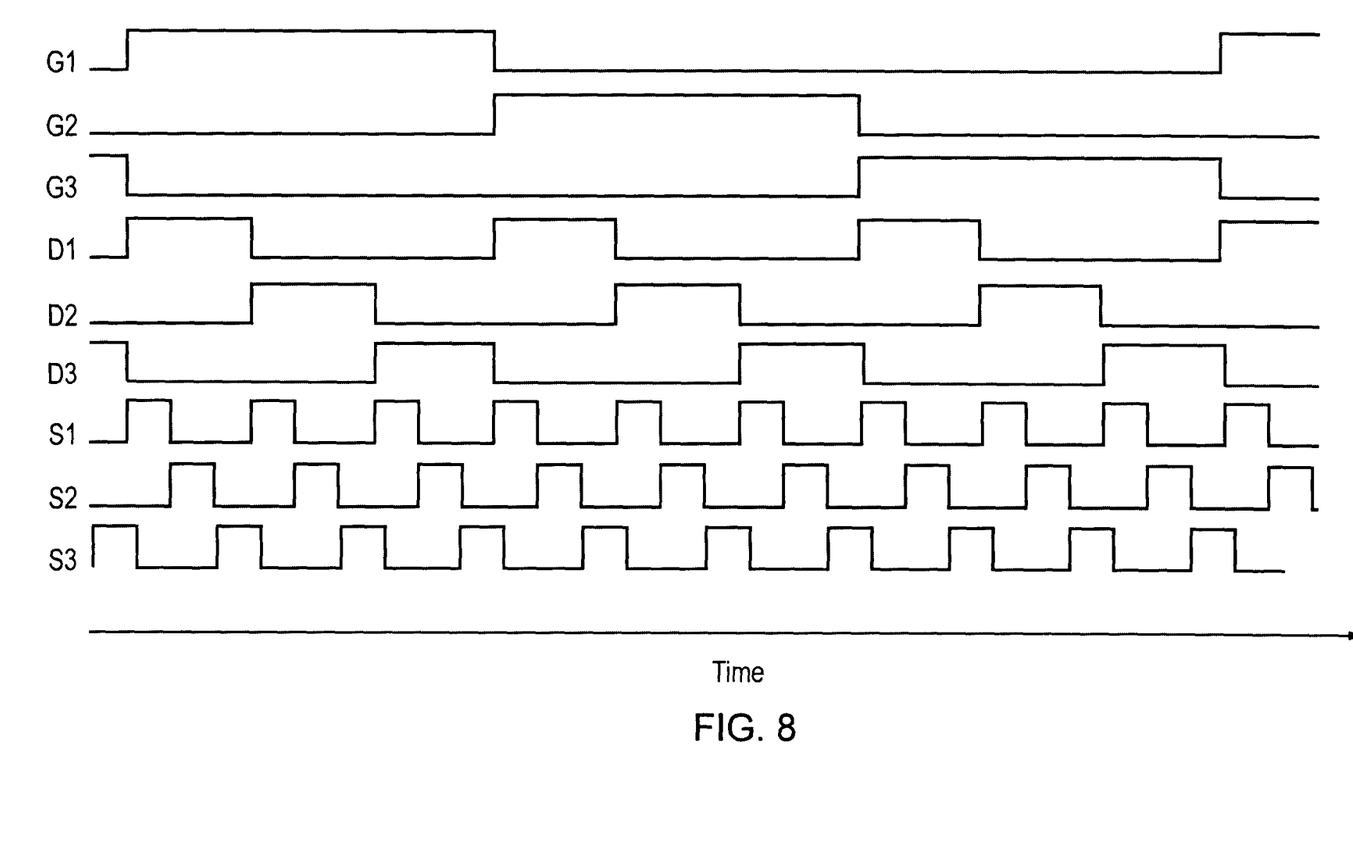
FIG. 8 illustrates an example sequence of how each of the selection circuitry may address each of the electrodes illustrated in FIG. 7.

An example sequence of how each of the selection circuitry 6, 8, 5 may address each of the electrodes is illustrated in FIG. 8.

The apparatus 10 of FIG. 7 may also comprise an input configured to receive an input signal 11 comprising a time varying component and an output configured to provide an output signal 13 that depends on each of the first, second and third sensor arrangements.

The apparatus 10 of FIG. 7 may also comprise processing circuitry configured to process output signals 13 from different areas of the different sensor arrangement 12 to determine the current capacitance for the different areas and the current resistance for the different areas. The apparatus 10 may comprise analysis circuitry configured to analyse the current capacitance and the current resistance for the different areas (cells).

The processing circuitry and the analysis circuitry may be integrated in a module 20 or they may be provided separately.

In some embodiments each of the different sensor arrangements may be configured to detect different parameters.

Figure 9:
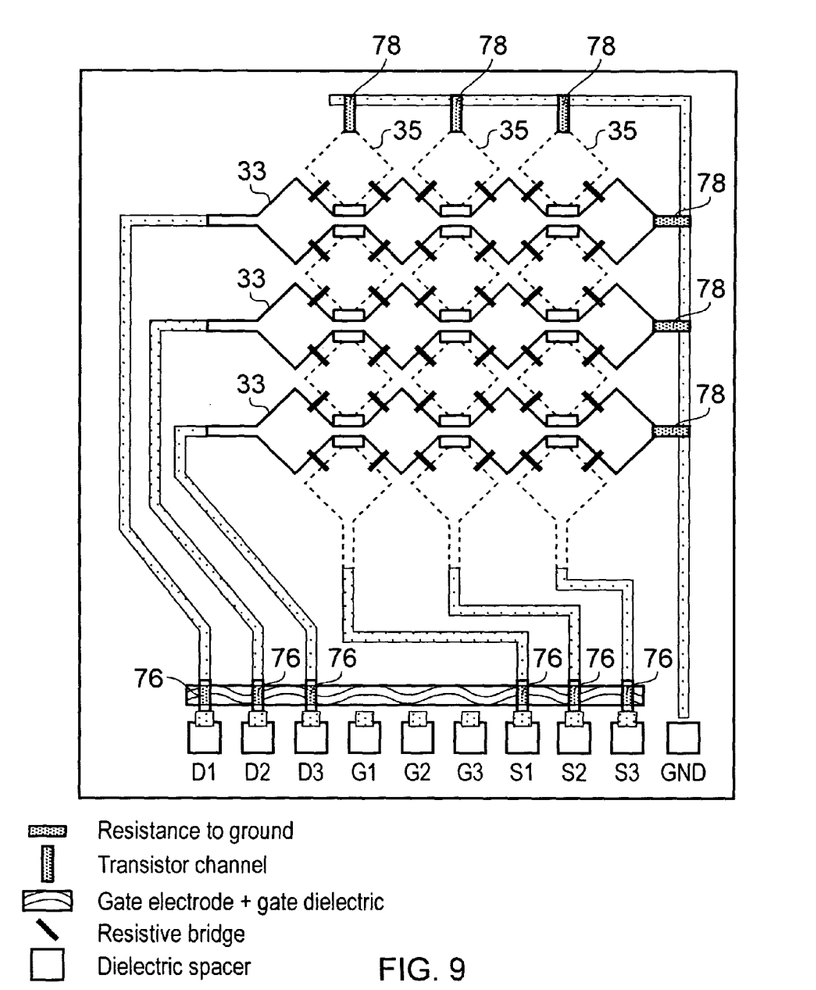
FIG. 9 schematically illustrates a sensor arrangement which may be provided in one or more of the layers of the apparatus illustrated in FIG. 7.

FIG. 9 schematically illustrates a sensor arrangement 12 which may be provided in one or more of the layers 71 of the apparatus 10 illustrated in FIG. 7. The sensor arrangement 12 comprises a plurality of variable resistance sensors integrated with a plurality of capacitance sensors. The sensors are formed by a plurality of drive and sense electrodes 33, 35.

Each row of the arrangement of FIG. 9 comprises a first plurality of interconnected drive electrodes 33 and each column comprises a second plurality of interconnected sense electrodes 35. At least one variable resistor sensor is associated with each row and/or column. In the illustrated example, at least one variable resistor sensor is connected between each row interconnect and each column interconnect, where the rows and column cross, and connected in parallel to a capacitor formed by a drive electrode 33 and a sense electrode 35.

In the example illustrated in FIG. 9 an in-line transistor 76 is integrated with the drive and sense electrodes 33, 35. The transistor 76 may be configured so that when the third selection circuitry 5 selects the gate for the particular layer 71 it turns the transistors for the drive and sense electrodes 33, 35 in that layer 71 to an on state and enables measurements from the sensor electrodes 35 to be obtained.

When the third selection circuitry 5 is configured so that the gate for a particular layer is not selected then the transistors for the drive and sense electrodes 33, 35 in that layer are turned to an off state.

The drive and sense electrodes 33, 35 are connected to ground via a high impedance resistor 78.

It is to be appreciated that other types of sensors could be used in other embodiments. For example in some embodiments one or more of the layers of sensors may comprise a piezo-resistive substrate 31 as described above.

Figure 10:
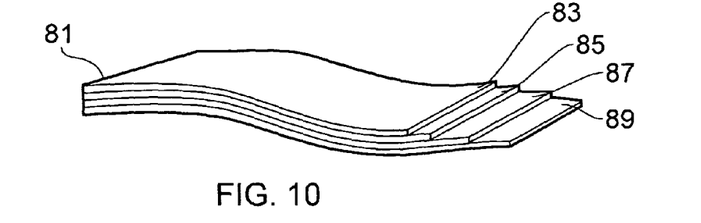
FIG. 10 illustrates a device which may incorporate an apparatus according to embodiments of the disclosure.

FIG. 10 illustrates a device 81 which may incorporate the above described sensor arrangements 12. The device 81 may comprise a plurality of layers 71 which form a multilayered skin. One or more of the layers 71 of the skin may comprise a sensor arrangement 12 as described above.

The device 81 may be flexible. The device 81 may be flexible so that it can be deformed by the user of the device 81 applying a force to the device 81. For example, a user may be able to change the shape of the device 81 by pulling or twisting the device 81.

In the example of FIG. 10 the device 81 comprises four layers. The first layer 83 may provide an outer surface of the device 81. The outer surface may come into direct contact with the environment and a user of the device 81. The outermost layer may comprise one or more sensors which may be configured to sense environmental parameters such as air quality, temperature and pressure or any other suitable parameter.

The second layer 85 may comprise sensors which may be configured to detect touch and/or deformation. Such sensors may comprise a piezo-resistive substrate 31 as described above.

The third layer 87 may comprise the electronic circuitry which may drive the device 81.

The fourth layer 89 may be configured to form an outer surface which may also be touched by the user of the device 81. This may mean that the fourth layer 89 may be touched by a user of the device 81. The fourth layer 89 may comprises one or more sensors which may be configured to respond to physiological parameters of the user, such as skin conductivity, heart rate, body temperature, blood oxygen level or any other suitable parameter.

Figure 11:
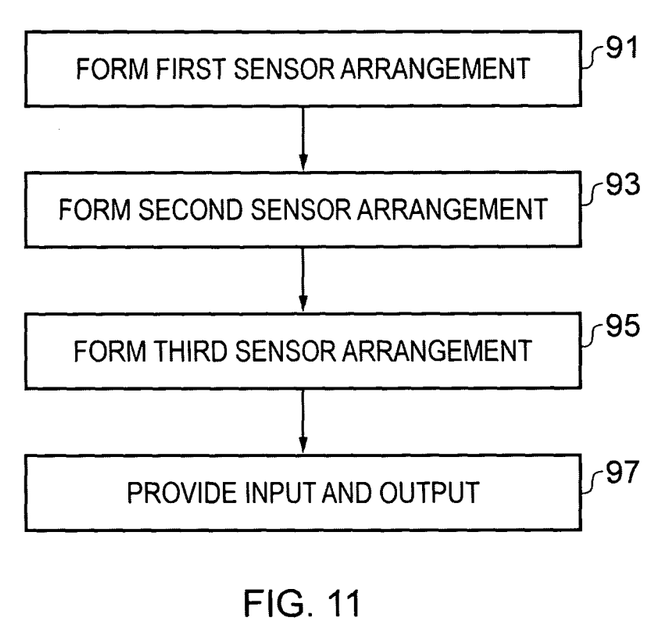
FIG. 11 illustrates another method.

FIG. 11 illustrates a method of manufacturing an apparatus 10.

The example method comprises, at block 91, forming a first sensor arrangement 12A configured in a first layer 71A. The method comprises, at block 93, forming a second sensor arrangement 12B configured in a second layer 71B. The method also comprises, at block 95, forming a third sensor arrangement 12B configured in a third layer 71B.

As described above each of the sensor arrangements 12 may be configured to vary an input signal in response to a sensed parameter.

The method may also comprise providing, at block 95 an input configured to receive an input signal comprising a time varying component and providing an output configured to provide an output signal that depends on each of the first, second and third sensor arrangements 12.

In some embodiments the method may comprise further blocks such as forming a protective layer over the sensor arrangement 12 or mounting the sensor arrangements 12 on a substrate.

In the above description the term 'connected' means operationally coupled and any number or combination of intervening elements can exist (including no intervening elements).

The analysis circuitry 24 previously described may be implemented using instructions that enable hardware functionality, for example, by using executable computer program instructions in a general-purpose or special-purpose processor that may be stored on a computer readable storage medium (disk, memory etc) to be executed by such a processor.

A processor may be configured to read from and write to the memory. The processor may also comprise an output interface via which data and/or commands are output by the processor and an input interface via which data and/or commands are input to the processor.

The memory stores a computer program comprising computer program instructions that control the operation of the apparatus 10 when loaded into the processor. The computer program instructions provide the logic and routines that enables the apparatus to perform the methods described. The processor by reading the memory is able to load and execute the computer program.

The apparatus 10 therefore comprises: at least one processor; and at least one memory including computer program code the at least one memory and the computer program code configured to, with the at least one processor, cause the analysis circuitry to perform as described.

The computer program may arrive at the apparatus 10 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program. The delivery mechanism may be a signal configured to reliably transfer the computer program. The apparatus 10 may propagate or transmit the computer program as a computer data signal.

Although the memory is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

As used here 'module' refers to a unit or apparatus that excludes certain parts/components that would be added by an end manufacturer or a user.

The blocks illustrated in the FIGS. 6 and 11 do not necessarily imply that there is a required or preferred order for the blocks and the order and arrangement of the block may be varied. Furthermore, it may be possible for some blocks to be omitted.

Although embodiments of the present disclosure have been described in the preceding paragraphs with reference to various examples, it should be appreciated that modifications to the examples given can be made without departing from the scope of the disclosure as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the disclosure believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
a first sensor arrangement configured in a first layer;
a second sensor arrangement configured in a second layer; and
an input configured to receive an input signal and an output configured to provide an output signal that depends on each of the first and second sensor arrangements;
wherein the sensor arrangements are configured to vary the input signal in response to a sensed parameter; and
wherein the apparatus comprises one or more further layers where a further sensor arrangement is configured in each of the further layers and the output signal depends on each of the first and second sensor arrangements and the further sensor arrangements.

2. An apparatus as claimed in claim 1 where the apparatus comprises at least one non-sensing layer.

3. An apparatus as claimed in claim 1 further comprising:
input circuitry configured to provide the input signal; and
output circuitry configured to detect a first impedance value comprising at least a real component and
configured to detect a second impedance value comprising at least an imaginary component, wherein the first component and the second component have a known phase off-set.

4. An apparatus as claimed in claim 1 wherein the input signal comprises a time varying component.

5. An apparatus as claimed in claim 3 wherein the first impedance value comprises only a real component and the second impedance value comprises only an imaginary component, wherein the first component and the second component are in quadrature.

6. An apparatus as claimed in claim 1 comprising first selection circuitry configure to selectively provide the input signal to the different selected sensor arrangements;
second selection circuitry configured to selectively provide the input signal to a first portion of the selected sensor arrangement; and
third selection circuitry configured to selectively receive the output signal from a second portion of the selected sensor arrangement, wherein the second portion overlaps the first portion of the first portion of the selected sensor arrangement.

7. An apparatus as claimed in claim 6 wherein the second selection circuitry is configured to sequence the first portion to which the input signal is provided through a series of different first portions of the selected sensor arrangement and the third selection circuitry is configured to sequence the second portion from which the output signal is received through a series of different second portions of the selected sensor arrangement.

8. An apparatus as claimed in claim 6 wherein the first portions of the selected sensor arrangement are parallel to a first direction, the second portions of the selected sensor arrangement are parallel to a second direction, and wherein the first and second directions are orthogonal.

9. An apparatus as claimed in claim 1 further comprising:
circuitry configured to process output signals from different areas of the sensor arrangements;
analysis circuitry configured to analyse the current capacitance and the current resistance for the different areas.

10. An apparatus as claimed in claim 1 wherein the second sensor arrangement is formed on a substrate which forms the first sensor arrangement.

11. An apparatus as claimed in claim 10 wherein the substrata comprises a piezo-resistive substrate.

12. A method of manufacturing an apparatus comprising:
forming a first sensor arrangement configured in a first layer;
forming a second sensor arrangement configured in a second layer;
providing an input configured to receive an input signal and providing an output configured to provide an output signal that depends on each of the first and second sensor arrangements; and
forming one or more further layers where a sensor arrangement is formed in each of the further layers;
wherein the sensor arrangements are configured to vary the input signal in response to a sensed parameter.

13. A method as claimed in claim 12 wherein the second sensor arrangement is formed on a substrate which forms the first sensor arrangement.

14. A method as claimed in claim 13 wherein the substrate comprises a piezo-resistive substrate.

15. A method as claimed in claim 13 wherein the substrate is configured to be deformed in response to a force applied by the user of the apparatus.

16. An apparatus comprising:
a piezo-resistive substrate configured to have a variable resistor that varies in response to a force applied to the apparatus;
a sensor arrangement comprising at least a first sensor, a second sensor, and a third sensor mounted on the piezo-resistive substrate; and
an input configured to receive an input signal and an output configured to provide an output signal that depends upon the impedance of the piezo-resistive substrate and the parameters sensed by the first sensor, the second sensor, and the third sensor of the sensor arrangement;
wherein the sensor arrangement is configured to vary the input signal in response to a sensed parameter.

17. An apparatus as claimed in claim 16 wherein the sensor arrangement comprises at least one variable resistor where the variable resistor has a resistance that varies with the sensed parameter.

18. An apparatus as claimed in claim 16 wherein the sensor arrangement comprises at least one capacitive sensor where the capacitive sensor has a capacitance that varies with the sensed parameter.

19. An apparatus as claimed in claim 1, wherein the second sensor arrangement is formed on a piezo-resistive substrate comprising a quantum tunneling composite, and wherein a conductive layer is located underneath the piezo-resistive substrate.

20. An apparatus as claimed in claim 11, wherein the input comprises a first electrode on the piezo-resistive substrate and the output comprises a second electrode on the piezo-resistive substrate, and wherein a layer of material having a capacitive transduction mechanism is disposed on the first, electrode and the second electrode, wherein the transduction mechanism allows for a change in permittivity of the material based on one or more of conductivity, temperature, humidity, and pH.

* * * * *

UNITED STATES PATENT AND TRADEMARK OFFICE
CERTIFICATE OF CORRECTION

PATENT NO. : 8,893,565 B2  
APPLICATION NO. : 13/548702  
DATED : November 25, 2014  
INVENTOR(S) : White et al.

It is certified that error appears in the above-identified patent and that said Letters Patent is hereby corrected as shown below:

In the Claim

Col. 17, line 38-39, claim 11, "substrata" should be deleted and --substrate-- should be inserted.

Signed and Sealed this  
Third Day of March, 2015

Michelle K. Lee  
*Deputy Director of the United States Patent and Trademark Office*